United States Patent
Verdoorn

(10) Patent No.: US 9,915,195 B2
(45) Date of Patent: Mar. 13, 2018

(54) FORCED INDUCTION DEVICE FOR A COMBUSTION ENGINE, COMBUSTION ENGINE AND METHOD FOR OPERATING A COMBUSTION ENGINE

(71) Applicant: Dr. Ing. h.c. F. Porsche Aktiengesellschaft, Stuttgart (DE)

(72) Inventor: Werner Verdoorn, Ludwigsburg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 17 days.

(21) Appl. No.: 14/793,776

(22) Filed: Jul. 8, 2015

(65) Prior Publication Data

US 2016/0010539 A1   Jan. 14, 2016

(30) Foreign Application Priority Data

Jul. 9, 2014  (DE) .......................... 10 2014 109 577

(51) Int. Cl.
*F02B 37/18*    (2006.01)
*F02B 33/40*    (2006.01)
(Continued)

(52) U.S. Cl.
CPC ............ *F02B 37/183* (2013.01); *F02B 33/40* (2013.01); *F02B 37/001* (2013.01);
(Continued)

(58) Field of Classification Search
CPC ...... F01N 13/107; F02B 33/40; F02B 37/001; F02B 37/004; F02B 37/007; F02B 37/013;
(Continued)

(56) References Cited

U.S. PATENT DOCUMENTS 5,142,868 A * 9/1992 Woon .................... F02B 37/005
                                                             60/602
8,534,066 B2   9/2013 Cavallo
(Continued)

FOREIGN PATENT DOCUMENTS

| CN | 1737346 A | 2/2006 | |
|---|---|---|---|
| DE | 10 2008 036 308 | 2/2010 | |
| DE | 10 2011 008 566 | 7/2012 | |
| DE | 10 2011 107 120 | 1/2013 | |
| EP | 1 400 667 | 3/2004 | |
| EP | 1400667 A2 * | 3/2004 | ............ F02B 37/001 |
| EP | 1 519 017 | 3/2005 | |
| EP | 1 519 017 | 6/2011 | |
| EP | 2 402 576 | 1/2012 | |
| EP | 1 400 667 | 1/2013 | |
| GB | 2472829 A | 2/2011 | |

(Continued)

OTHER PUBLICATIONS

British Search Report dated Dec. 21, 2015.
(Continued)

*Primary Examiner* — Audrey K Bradley
(74) *Attorney, Agent, or Firm* — Gerald E. Hespos; Michael J. Porco; Matthew T. Hespos

(57) ABSTRACT

Exhaust gas from a first outlet port (5) of a cylinder (3) of a combustion engine (2) can flow through the first turbocharger (7), and exhaust gas from a second outlet port (6) of the cylinder (3) can flow through the second turbocharger (17). A first connecting duct (28) can supply the second turbine (19) with exhaust gas from the first turbine (9). The first connecting duct (28) is connected to a first bypass duct (29) that issues into a tailpipe line (32) downstream of the second turbine (19) to bypass the second turbine (19). The first bypass duct (29) has a second control valve (44) that can block the first bypass duct (29). The first connecting duct (28) has a first control valve (43) that can block the first connecting duct (28) to prevent exhaust gas from flowing through the first turbine (9) to the second turbine (19).

10 Claims, 3 Drawing Sheets

(51) Int. Cl.
*F02B 37/007* (2006.01)
*F02B 37/013* (2006.01)
*F02B 37/00* (2006.01)
*F02B 37/02* (2006.01)
*F02D 13/02* (2006.01)
*F01N 13/10* (2010.01)

(52) U.S. Cl.
CPC .......... *F02B 37/004* (2013.01); *F02B 37/007* (2013.01); *F02B 37/013* (2013.01); *F02B 37/02* (2013.01); *F02D 13/0242* (2013.01); *F02D 13/0257* (2013.01); *F01N 13/107* (2013.01); *Y02T 10/144* (2013.01); *Y02T 10/18* (2013.01)

(58) Field of Classification Search
CPC .... F02B 37/02; F02B 37/183; F02D 13/0242; F02D 13/0257; Y02T 10/144; Y02T 10/18
See application file for complete search history.

(56) References Cited

U.S. PATENT DOCUMENTS

| | | |
|---|---|---|
| 2008/0216795 A1 | 9/2008 | Dietz |
| 2011/0020108 A1 | 1/2011 | Axelsson |
| 2011/0296828 A1 | 12/2011 | An |

FOREIGN PATENT DOCUMENTS

| | | |
|---|---|---|
| JP | 2010-133303 | 6/2010 |
| WO | 2008/122725 | 10/2008 |

OTHER PUBLICATIONS

German Search Report dated Apr. 22, 2015.
English Translation of Japanese Office Action dated Jun. 1, 2019.

\* cited by examiner

FORCED INDUCTION DEVICE FOR A COMBUSTION ENGINE, COMBUSTION ENGINE AND METHOD FOR OPERATING A COMBUSTION ENGINE

CROSS REFERENCE TO RELATED APPLICATION

This application claims priority under 35 USC 119 to German Patent Appl. No. 10 2014 109 577.4 filed on Jul. 9, 2014, the entire disclosure of which is incorporated herein by reference.

BACKGROUND

1. Field of the Invention

The invention relates to a forced induction device for a combustion engine, a combustion engine with such a forced induction device and a method for operating a combustion engine that has a forced induction device.

2. Description of the Related Art

Exhaust turbocharging requires a rapid response by the exhaust turbocharger. An exhaust turbocharger that is too small ensures a rapid response, but can make available fresh air or combustion air to the combustion engine to only a limited extent in the upper speed and/or load range. A large exhaust turbocharger can make available sufficient combustion air, but has a poor response due to a high mass moment of inertia of its rotor assembly.

A combination of two exhaust turbochargers often is used in the construction of combustion engines. Various arrangements of the exhaust turbochargers relative to one another and positioning of the various control elements at different branches and entries of a duct system are provided for fluidically connecting the two exhaust turbochargers to one another. In particular, the aim is to combine two traditional forced induction methods, sequential charging and 2-stage charging, in such a way that a desired operating behavior of the combustion engine can be achieved.

DE 10 2011 008 566, DE 10 2011 107 120 and EP 2 402 576 and EP 1 519 017 disclose forced induction devices having two exhaust turbochargers arranged in series. The turbines of the exhaust turbochargers are arranged in an exhaust line of the combustion engine and the compressors are arranged in an intake section of the combustion engine to implement single, parallel or serial operation of the two exhaust turbochargers in different operating ranges of the combustion engine. The exhaust line has a single exhaust manifold that is connected fluidically to the combustion engine in such a way that all of the outlet ports of the combustion engine are connected to the exhaust manifold in a manner that allows through flow. Thus, exhaust gas from the individual cylinder head or the individual outlet ports first flows through this single exhaust manifold before it flows through the turbines into the exhaust line in accordance with a valve configuration.

DE 10 2008 036 308 discloses a combustion engine having first and second exhaust turbochargers. First and second outlet ports of the cylinder head are formed per cylinder head of the combustion engine. The first exhaust turbocharger is connected to the first outlet ports in a manner that allows through flow and the second exhaust turbocharger is connected to the second outlet ports in a manner that allows through flow. A selector valve enables exhaust gas flowing through the second outlet ports to be admitted to the first exhaust turbocharger. A variable valve timing system also is provided for changing a timing of the outlet valves and modifying a corresponding time of admission to the corresponding turbine. An exhaust turbocharger that is bypassed no longer has a flow therethrough, and its rotor assembly comes to a halt. Therefore, the mass moment of inertia must be overcome when exhaust gas is re-admitted to the exhaust turbocharger and impacts the stationary rotor. This leads to a delayed response.

EP 1 400 667 discloses a forced induction device for a combustion engine with first and second outlet ports at each cylinder head. The first outlet ports connect to a first exhaust turbocharger in a manner that allows through flow and the second outlet ports connect to a second exhaust turbocharger in a manner that allows through flow. A valve timing system connects fluidically to the second exhaust turbocharger for shutting down outlet valves. However, this forced induction device does not permit the two exhaust turbochargers to be operated independently of one another in a sequential charging mode, and hence the two exhaust turbochargers are not used efficiently.

It is an object of the invention to provide a forced induction device that can be operated efficiently. It is another object of the invention to develop a combustion engine that has an improved response while simultaneously having a high power. A further object of the invention to specify a method for operating a combustion engine efficiently.

SUMMARY

A forced induction device for a combustion engine according to the invention comprises first and second exhaust turbochargers. The first exhaust turbocharger has a first turbine mounted in a first exhaust line in a manner that allows through flow. The first exhaust line has a first exhaust manifold upstream of the first turbine and connected to a first outlet port of a cylinder head of the combustion engine. Thus, the first turbine can be supplied exclusively with exhaust gas emerging from the first outlet port. The second exhaust turbocharger is mounted in a second exhaust line that is formed independently of the first exhaust line and has a second exhaust manifold upstream of the second turbine. The second exhaust manifold can be connected to a second outlet port of the combustion engine. A first conducting duct is downstream of the first turbine and upstream of the second turbine. The first connecting duct allows through flow and supplies the second turbine with exhaust gas emerging from the first turbine. The first connecting duct has a first branch with a first bypass duct that is connected to the connecting duct in a manner that allows through flow and by means of which it is possible to bypass the second turbine. For this purpose, the first bypass duct issues at a first entry into a tailpipe line formed downstream of the second turbine. The first connecting duct has a first control valve that can block or open the first connecting duct to enable the second turbine to be bypassed, i.e. exhaust gas that flows through the first turbine cannot flow through the second turbine. A second control valve is arranged in this first bypass duct for blocking or opening the first bypass duct.

The forced induction device of the invention functions so that, in a low load and/or speed range with the second outlet valves shut down, the exhaust gas flowing out of the combustion engine can be passed completely to the first turbine and, when the first connecting duct is closed by the first control valve, this exhaust gas can be admitted to the second turbine, ensuring that a rotor assembly of the second exhaust turbocharger is already performing a rotary motion in this operating range and its mass moment of inertia can be overcome. In a full load range, in contrast, it is possible, with a first connecting duct opened by the first control valve, for the second turbine to be supplied exclusively with exhaust gas from the second outlet ports and thus to be operated up to its choke limit independently of exhaust gas flowing through the first turbine. As a result, it is possible to achieve the full maximum power of both the first and second turbines. When both turbines are operating at their maximum power, their compressors can also operate at maximum power, thus making it possible to achieve a very high boost pressure in the fresh air that can be fed to the combustion engine.

The above-described arrangement enables the first exhaust turbocharger to be operated at its inherent full power in a low speed and/or load range, and enables both exhaust turbochargers to be operated at their inherent full power in the full load range. Thus, the maximum power of the first exhaust turbocharger can be obtained in the low speed and/or load range, as can the maximum power of both exhaust turbochargers in the full load range and/or at high speeds. Therefore, the forced induction device is designed for efficient operation.

Compressor power of the second compressor of the second exhaust turbocharger produced by the turbine work of the second turbine is also used in the low speed and/or load range of the combustion engine. More particularly, the forced induction device has an intake pipe that can be connected to the combustion engine for supplying fresh air, and the first compressor of the first exhaust turbocharger is arranged in the intake pipe downstream of the second compressor. Thus, fresh air drawn in by the first compressor flows through the second compressor and is pre-compressed by the rotation of the second compressor driven by the second turbine.

In a medium speed and/or load range, it is sufficient if it is the second exhaust turbocharger that primarily delivers fresh air. To ensure that there are no flow losses of the fresh air delivered in this way, at least some of this fresh air is diverted past the first compressor with the aid of a third bypass duct. The third bypass duct branches off from the intake pipe downstream of the first compressor and upstream of the second compressor and issues into the intake pipe downstream of the first compressor. A flow path in the intake pipe is formed between the first compressor and the second compressor and remains open to enable the first compressor to operate in the absence of a vacuum by being rotated by the first turbine. Any available compressor power of the first compressor is used, and the fresh air quantity compressed by the first compressor is fed downstream of the third control valve to the intake pipe formed downstream of the first compressor.

A second bypass duct is formed to partially bypass the second compressor so that both compressors can operate independently of one another and in parallel, which is efficient especially in a full load range and/or at high speeds of the combustion engine. The second bypass duct branches off from the intake pipe at a second branch upstream of the first compressor and issues into the intake pipe at a second entry downstream of the second compressor, downstream of the third entry and upstream of the first compressor. A third control valve may be formed in the intake pipe downstream of the second compressor and upstream of the second entry, and a fifth control valve, such as a non-return throttle valve, may be arranged in the second bypass duct to avoid a possible vacuum.

The forced induction device of the invention can achieve three-stage charging with the aid of two exhaust turbochargers. At least one of the exhaust turbochargers in each of the three stages produces a maximum power that can be achieved up to a surge limit. Additionally, the rotor assemblies of the exhaust turbochargers rotate over the entire operating range, thereby largely overcoming the mass moment of inertia of the chargers and significantly improving a response of the exhaust turbochargers. Additionally, a bearing assembly associated with the respective rotor assembly is advantageously substantially in a condition of mixed or liquid friction due to continuous rotation from the beginning of operation of the combustion engine, provided that plane bearings are used for support, as is customary.

A combustion engine according to the invention comprises a cylinder head. The cylinder head has one inlet port per cylinder, a first outlet port and a second outlet port. The first outlet port can be opened and closed with the aid of a first outlet valve and the second outlet port can be opened and closed with the aid of a second outlet valve. An engine control unit of the combustion engine controls a variable valve timing system assigned to the combustion engine for varying valve timings of the valves and for shutting down the second outlet valve. The combustion engine also has the above-described forced induction device.

The combustion engine of the invention achieves efficient operation. For example, exhaust gas mass is small in a low load range as compared to higher loads. If operation of the first exhaust turbocharger at maximum power should be brought about, it is possible to supply a sufficient charge air quantity to the combustion engine in this operating range, while, at the same time, the rotor assembly of the second turbocharger can overcome its mass moment of inertia due to the flow through the second turbine, thus eliminating or at least reducing "turbo lag" during a change in the load and/or speed.

Further advantages, features and details of the invention will become apparent from the following description of preferred embodiments and with reference to the drawings. Features and combinations of features mentioned above in the description and features and combinations of features mentioned below in the description of the figures or shown exclusively in the figures can be used in the respectively indicated combination and also in other combinations or in isolation without exceeding the scope of the invention. Elements that are the same or functionally identical are assigned identical reference signs. For reasons of clarity, the elements may not be provided with their reference sign in all the figures, but they do not thereby lose their association.

DETAILED DESCRIPTION

Figure 1:
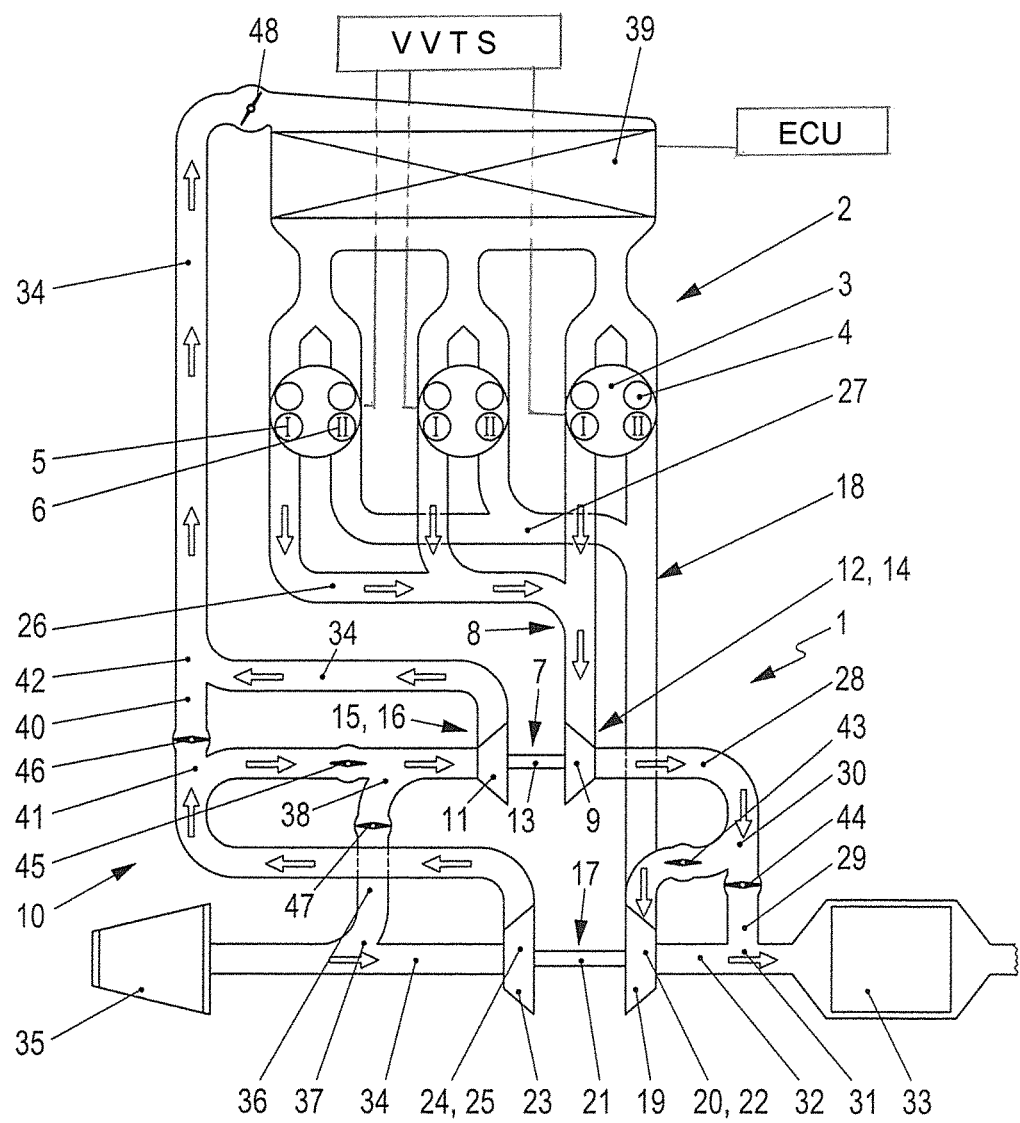
FIG. 1 is a schematic illustration of a combustion engine with a forced induction device according to the invention in a first operating interval.

FIG. 1 is a schematic illustration of a forced induction device 1 according to the invention for a combustion engine 2, such as a diesel engine or a spark ignition engine of a motor vehicle. By way of example, the combustion engine 2 is in the form of a 3-cylinder engine, but could have a different number of cylinders.

Each cylinder 3 of the combustion engine 2 has two inlet ports 4, each of which has an inlet valve (not shown specifically). Each cylinder 3 also has two outlet ports, first and second outlet ports 5 and 6, each of which has an outlet valve (not shown specifically). To allow clear differentiation and association of the individual outlet ports with exhaust lines of the kind described below, the outlet ports 5, 6 of each cylinder 3 are additionally designated by a I or II in the figures.

The combustion engine 2 further is assigned an engine control unit ECU and a variable valve timing system VVTS. The engine control unit ECU controls ignition times, injection quantities and operation of the variable valve timing system VVTS. Thus, depending on different parameters, such as engine speed or quantity of fuel injected, an opening and/or closing time of the valves can be changed. Complete valve shutdown also can be performed. In the case of valve shutdown, the port assigned to the valve is closed, independently of the charge exchange in the combustion engine 2.

The forced induction device 1 comprises a first exhaust turbocharger 7 having a first turbine 9 arranged in a first exhaust line 8 of the combustion engine 2, and a first compressor 11 arranged in an intake section 10 of the combustion engine 2. The first turbine 9 comprises a first turbine casing 12 that allows through flow. A first turbine wheel 14 is mounted rotatably in the first turbine casing 12 and is connected for conjoint rotation to a first shaft 13 of the first exhaust turbocharger 7.

The first compressor 11 comprises a first compressor casing 15 that allows through flow. A first compressor wheel 16 is mounted rotatably in the first compressor casing 15 and is connected for conjoint rotation to the first shaft 13. The first compressor 11 is used to feed compressed air to the combustion engine 2.

The forced induction device 1 further comprises a second exhaust turbocharger 17 that is larger than the first exhaust turbocharger 7. The second exhaust turbocharger 7 has a second turbine 19 arranged in a second exhaust line 18 of the combustion engine 2. The second turbine 19 also comprises a second turbine casing 20 that allows through flow. A second turbine wheel 22 is mounted rotatably in the second turbine casing 20 and is connected for conjoint rotation to a second shaft 21 of the second exhaust turbocharger 17. The second exhaust turbocharger 17 also has a second compressor 23 with a second compressor casing 24 that allows through flow. A second compressor wheel 25 is mounted rotatably in the second compressor 23 and is connected for conjoint rotation to the second shaft 21. The second compressor 23, like the first compressor 11, is arranged in the intake section 10 and enables compressed air to be fed to the combustion engine.

The first outlet ports 5 are connected fluidically, and hence in a manner that allows through flow, to a first exhaust manifold 26 of the first exhaust line 8. The first exhaust manifold 26 is designed to receive exhaust gas that flows out from the combustion engine 2 when the first outlet ports are opened, and carries the exhaust gas to the first turbine 9.

The second outlet ports 6 are connected fluidically to a second exhaust manifold 27 of the second exhaust line 18. The second exhaust manifold 27 is designed to receive exhaust gas from the combustion engine 2 when the second outlet ports are opened, and carries the exhaust gas to the second turbine 19.

A first connecting duct 28 fluidically connects the first exhaust line 8 and the second exhaust line 18 at a position downstream of the first turbine 9 and upstream of the second turbine 19. The first connecting duct 28 connects a first outlet port of the first turbine casing 12 to a second inlet port of the second turbine casing 20, allowing at least some of the exhaust gas fed to the first turbine 9 to flow through the second turbine 19.

A first bypass duct 29 branches off from the first connecting duct 28 at a first branch 30 downstream of the first turbine casing 12 and upstream of the second turbine casing 20 for partially or completely preventing expanded exhaust gas flowing out of the first turbine 9 from flowing through the second turbine 19. The first bypass duct 29 issues into a tailpipe line 32 of the combustion engine 2 at a first entry 31 downstream of the second turbine casing 20 and upstream of an exhaust gas after-treatment unit 33 arranged in the tailpipe line 32.

The second compressor 23 is upstream of the first compressor 11 in an intake pipe 34 of the intake section 10 and receives fresh air that has been filtered by an air filter 35 arranged in the intake pipe 34 upstream of the second compressor 23. A second bypass duct 36 is downstream of the air filter 35 and upstream of the second compressor 23 to enable the first compressor 11 to draw in fresh air independently of the second compressor 23. The second bypass duct 36 branches off from the intake pipe 34 at a second branch 37 and issues at a second entry 38 in the intake pipe 34 upstream of the first compressor casing 15 and downstream of the second compressor casing 24.

The intake pipe 34 is connected to a charge air cooler 39 that is downstream of the first compressor 11 and upstream of the inlet ports 4 of the combustion engine 2 to cool the compressed intake air. Thus, compressed and cooled air can be fed for combustion to the combustion engine 2 via the inlet ports 4 when the inlet valves are open. A throttle valve 48 is formed downstream of the third entry and upstream of the charge air cooler 39 for setting a particular fresh air quantity.

A third bypass duct 40 branches off from the intake pipe 34 at a third branch 41 upstream of the second entry 38 and downstream of the second compressor casing 24 so that fresh air compressed and delivered by the second compressor 23 can be diverted past the first compressor 11. The third bypass duct 40 issues into the intake pipe 34 at a third entry 42 downstream of the first compressor casing 15.

Various control valves are used to implement different operating states of the forced induction device 1. A first control valve 43 is positioned at the first branch 30 for opening or closing the first connecting duct 28. A second control valve 44 is at the first entry 31 and allows or prevents exhaust gas from emerging from the bypass duct 29 into the tailpipe line 32.

A third control valve 45 is at the second entry 38 and can block or enable fresh air induction from the second bypass duct 36 by the first compressor 11. Moreover, a fourth control valve 46 is at the third branch 41 and enables a fresh air mass flow to be delivered by the second compressor 23 directly into the third bypass duct 40. Alternatively, the fourth control valve 46 can close the third bypass duct 40 at the third branch 41 so that the fresh air quantity delivered by the second compressor 23 flows through the first compressor 11 and is compressed additionally in accordance with the compression ratio of the compressor.

The first and second compressors 11 and 23 can be driven respectively by the first and second turbines 9 and 19. The first turbines 9 and 19 are driven by the exhaust gas from the combustion engine 2. The turbine wheels 14, 22 are supplied with the exhaust gas and thus are made to rotate. As a result, the compressor wheels 16 and 25 are driven by the first and second shafts 13 and 21, respectively.

The control valves 43, 44, 45, 46 can open the ducts and pipes associated therewith between a fully closed position and full opening, depending on requirements. The control valves 43, 44, 45, 46 are connected to an open-loop and closed-loop control device (not shown specifically) of the combustion engine 2 for the purpose of setting.

A self-regulating non-return throttle valve 47 is in the second bypass duct 36, downstream of the second branch 37 and upstream of the second entry 38.

A variable valve timing system (not shown specifically) is assigned to the combustion engine 2 for holding the second outlet ports 6 closed in a certain operating state of the forced induction device 1.

Three different operating states of the combustion engine 2 that can be achieved with the forced induction device 1 are described with reference to FIGS. 1 to 3. For each illustrated operating state, the ducts through which there is flow have arrows pointing in a direction of flow. Ducts through which there is no flow or that are closed are illustrated without arrows.

A first operating state of the forced induction device 1 is shown in FIG. 1. In this operating state, the variable valve timing system has closed the second outlet ports 6 fully. Thus, the outlet ports 6 are not opened, even in an exhaust phase of the combustion engine 2, and all of the exhaust gas flows out exclusively via the first outlet ports 5. Thus, the exhaust gas is admitted to the first turbine 9 rotates the first turbine wheel 14. The first shaft 13 connects the first turbine wheel 14 to the first compressor wheel 16. Thus the first compressor wheel 16 also is set in rotation and draws in fresh air.

The first control valve 43 opens the first connecting duct 28, while the second control valve 44 blocks the first bypass duct 29. As a result, all of the exhaust gas flowing out of the first turbine 9 is fed to the second turbine 19 and sets the second turbine wheel 22 in rotation.

In this first operating range, however, the exhaust gas quantity and the exhaust gas pressure applied to this exhaust gas quantity is just sufficient to bring the first turbine 9 to a corresponding delivery speed. Thus, the second turbine wheel 22 is acted upon by an exhaust gas quantity that already has been expanded through the first turbine 9, which is just sufficient to set the second turbine wheel 22 in rotation. The second shaft 21 is connected for conjoint rotation to the second turbine wheel 22 and the second compressor wheel 25. Thus, the second compressor wheel 22 also is set in rotation. As a result, the fresh air quantity flowing through the second compressor 23 has at least a slight pressure increase before it undergoes a further pressure increase in the first compressor 11. However, a rotor assembly of the second exhaust turbocharger 17 is set in rotation, ensuring that its mass moment of inertia is at least partially overcome.

At this point, it may be mentioned that the mass moment of inertia of an exhaust gas turbocharger is determined by the weight of its rotor assembly, which is made up of the compressor wheel, the turbine wheel and the shaft connecting the wheels for conjoint rotation.

In the intake section 10, the first compressor 11 delivers fresh air from the part of the intake pipe 34 downstream of the first compressor 11. The non-return valve 47 closes the second bypass duct 36 so that all the fresh air quantity delivered by the first compressor 11 can flow via the second compressor 23. Pre-compression of the fresh air due to the second compressor 23 is slight. The third bypass duct 40 is closed so that all of the fresh air drawn in can be compressed fully in the first compressor 11 and does not in part directly enter a part of the intake pipe 34 between the charge air cooler 39 and the third entry, which has only a slight boost pressure produced by the second compressor 24.

By way of example, this operating state can be established at a low load and/or in a low speed range, e.g. at about 1200-2200 rpm, of the combustion engine 2.

Figure 2:
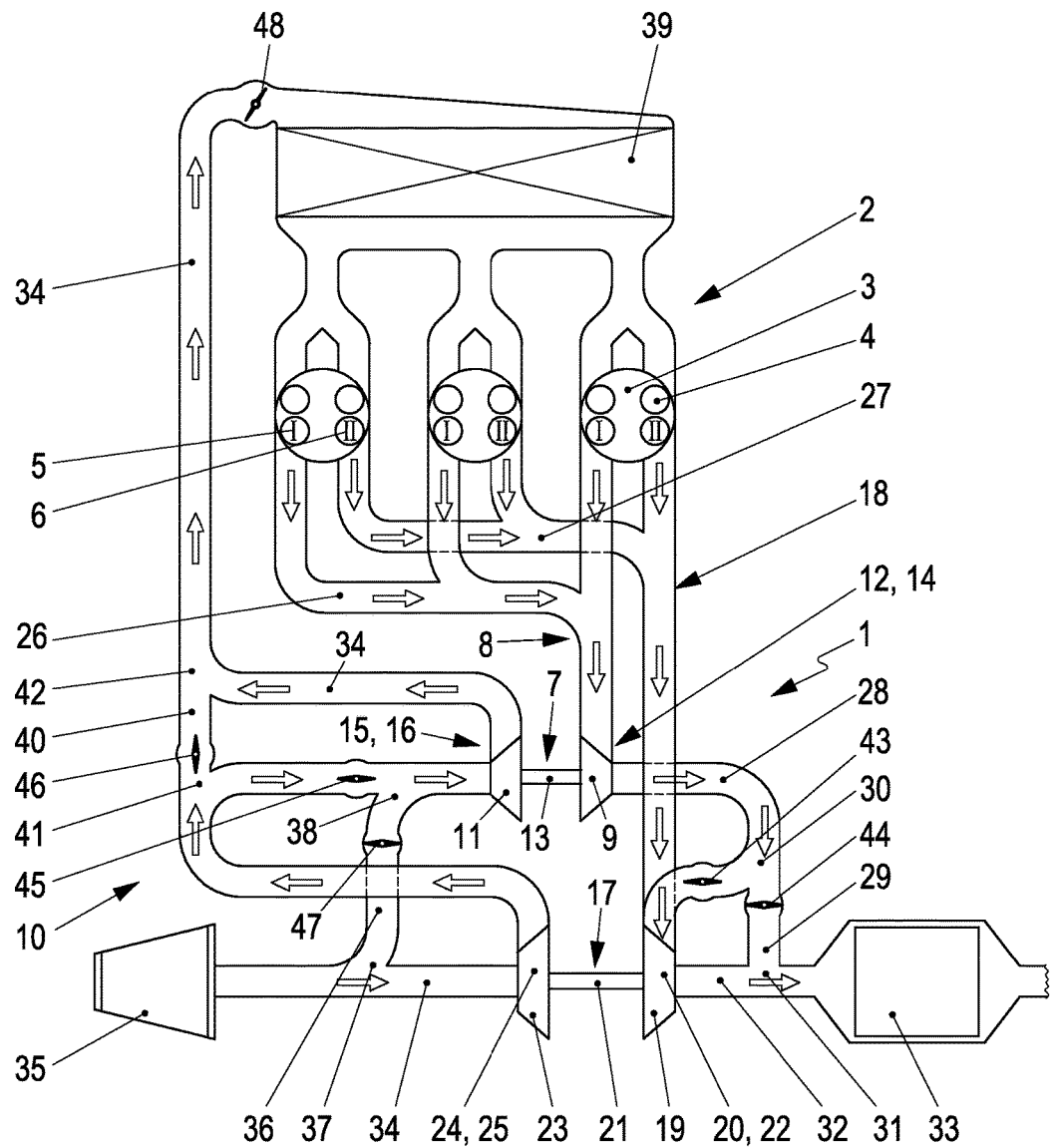
FIG. 2 is a schematic illustration of the combustion engine with the forced induction device of the invention in a second operating interval.

FIG. 2 shows schematically a second operating state of the forced induction device 1. This operating state is preferably established at a medium load and/or in a medium speed range, e.g. at about 2200-4500 rpm, of the combustion engine 2. The position of the control valves, as explained in greater detail below, is set when the first turbine 9 has reached its surge limit. This means that the power of the first exhaust turbocharger 7 cannot be increased despite an increased exhaust gas mass flow. On the contrary, there are power losses in the exhaust turbocharger above the surge limit, due to the excessive exhaust gas mass flow through the turbine.

In this operating state, the variable valve timing system opens the second outlet ports 6 fully. Thus, exhaust gas that flows out of the first outlet ports 5 acts on the first turbine 9, and the exhaust gas that flows through the second outlet ports 6 acts on the second turbine 19. As a result, both the first and second turbine wheels 14 and 22 receive a flow of exhaust gas, which has a certain exhaust gas backpressure formed in this second operating range. This exhaust gas backpressure is higher than the exhaust gas backpressure in the first operating range.

The first control valve 43 opens the first connecting duct 28, while the second control valve 44 blocks the first bypass duct 29. As a result, all of the exhaust gas flowing out of the first turbine 9 continues to be fed to the second turbine 19 and acts on the second turbine 19 in addition to the exhaust gas flowing out of the second exhaust manifold 27.

In the intake section 10, the first compressor 11 continues to deliver fresh air from the part of the intake pipe 34 downstream of the first compressor 11. The non-return valve 47 in the second bypass duct 36 is closed, while the fourth control valve 46 now opens the third bypass duct 40. The third control valve 45 likewise continues to be set to open a segment of the intake pipe 34 between the first and second compressors 11 and 23. Thus, only some of the charge air drawn in and compressed by the second compressor 23 is passed via the first compressor 11, thus ensuring that the rotor assembly of the first exhaust turbocharger 7 can continue to perform a rotary motion.

In this second operating state, the second compressor 23 delivers the necessary fresh air quantity to be made available to the combustion engine 2. In this low load and/or speed range, the second outlet valve 6 is shut, and expanded exhaust gas from the first exhaust gas turbocharger 7 flows through the second exhaust turbocharger 17.

In this medium load and/or speed range of the second operating state, there is a flow of expanded exhaust gas from the first exhaust turbocharger 7 and additionally a flow of exhaust gas flowing out of the second outlet port 6 through the second exhaust turbocharger 17.

Figure 3:
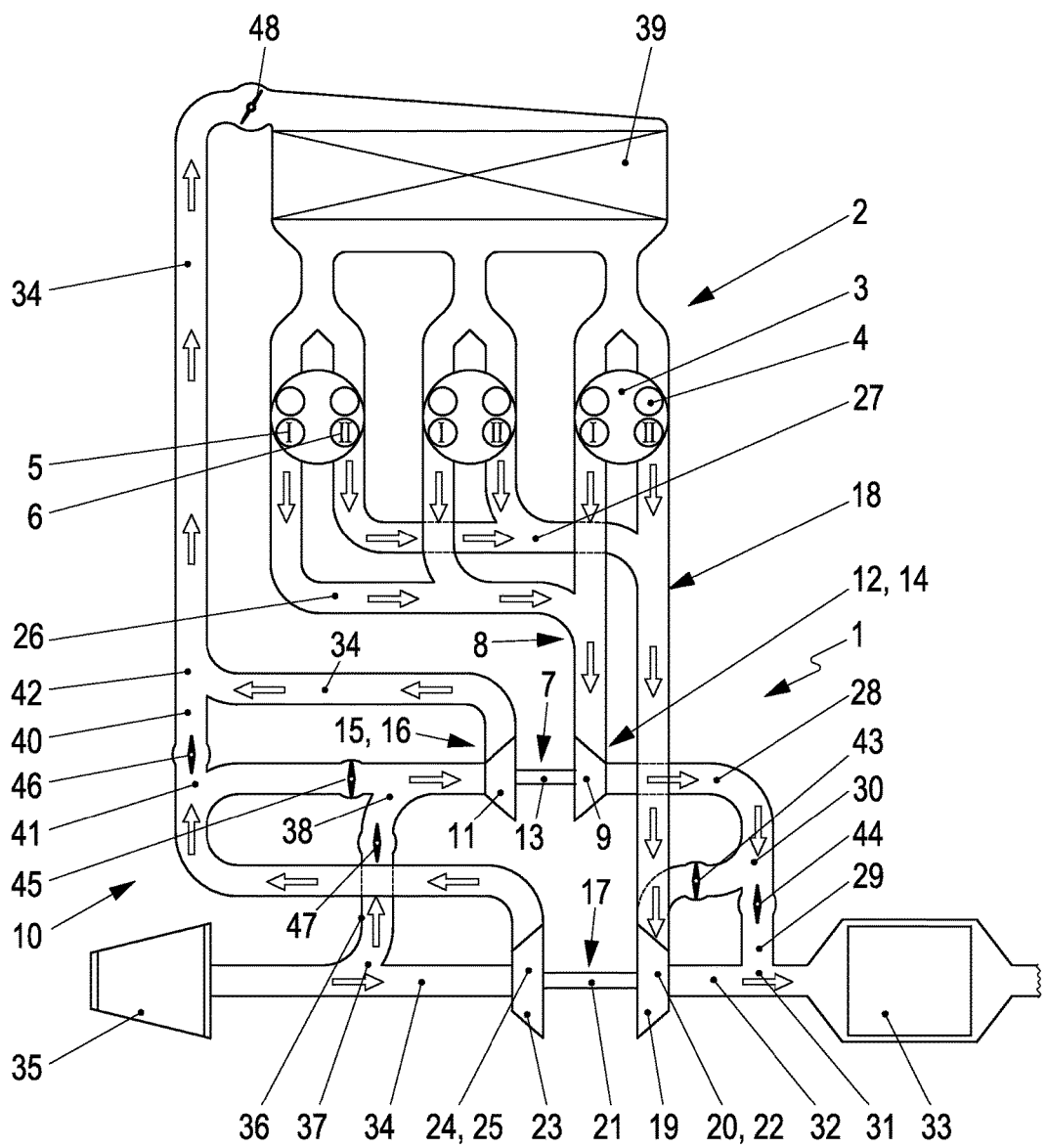
FIG. 3 is a schematic illustration of the combustion engine with the forced induction device of the invention in a third operating interval.

A third operating state of the forced induction device 1 is shown in FIG. 3. This operating state corresponds to operation of the combustion engine 2 at full load and/or high speeds, e.g. at about 4500-7000 rpm. The position of the control valves, as explained in greater detail below, should be set when the second turbine 19 has likewise reached its surge limit.

In this operating state, the variable valve timing system opens the second outlet ports 6. In contrast to the first and second operating states, the first control valve 43 at the first branch 30 now blocks a flow path of the exhaust gas through the first connecting duct 28 to the second turbine 19. However, the second control valve 44 opens the first bypass duct 29. As a result, the exhaust gas flowing through the first turbine 11 is diverted past the second turbine 19 into the tailpipe line 32 downstream of the second turbine 19 and upstream of the exhaust gas after-treatment unit 33. In this operating state, boost pressure control can be performed with the aid of the first control valve 43.

This means that the first and second exhaust lines 10 and 18 now are connected fluidically to one another only in the tailpipe line 32. The entire exhaust gas flow is divided between both exhaust turbochargers 7, 17.

The third control valve 45 is closed, with the result that the flow path between the first compressor 11 and the second compressor 23 is blocked. The non-return valve 47 is open, thus allowing the first compressor 11 to draw in and compress fresh air independently of the second compressor 23.

This circuit configuration corresponds to sequential charging, since both exhaust turbochargers 7, 17 are acted upon completely independently of one another and operate completely independently of one another. Thus, in the third operating range, which shows a full load and/or high speed range, only exhaust gas flowing out of the second exhaust port 6 flows through the second exhaust turbocharger 17.

What is claimed is:

1. A forced induction device for a combustion engine having plural cylinders, with each of the cylinders having first and second outlet ports, comprising:
    first and second exhaust turbochargers, a first exhaust line directing all exhaust gas emerging from the first outlet port of each of the cylinders of the combustion engine to the first exhaust turbocharger, and a second exhaust line directing all exhaust gas emerging from the second outlet port of each of the cylinders to the second exhaust turbocharger,
    a first connecting duct downstream of a first turbine of the first turbocharger and upstream of a second turbine of the second exhaust turbocharger for supplying the second turbine with exhaust gas from the first turbine,
    a first control valve in the first conducting duct and configured to selectively block the first connecting duct to prevent exhaust gas that has flowed through the first turbine from flowing to the second turbine,
    a first bypass duct connected to the first connecting duct at a first branch, the first bypass duct issuing at a first entry into a tailpipe line downstream of the second turbine to bypass the second turbine, and
    a second control valve in the first bypass duct for blocking or opening the first bypass duct.

2. The forced induction device of claim 1, wherein the first exhaust turbocharger is smaller than the second exhaust turbocharger.

3. The forced induction device of claim 1, wherein the first exhaust turbocharger has a first compressor and the second exhaust turbocharger has a second compressor, the forced induction device further comprising an intake pipe for supplying fresh air to the combustion engine, the first compressor being in the intake pipe downstream of the second compressor of the second exhaust turbocharger, and the intake pipe having an upstream portion that is upstream of the second compressor and a downstream portion that is downstream of the first compressor.

4. The forced induction device of claim 3, further comprising a second bypass duct branching off from the intake pipe at a second branch upstream of the first compressor and issuing into the intake pipe at a second entry downstream of the second compressor and upstream of the first compressor, the second bypass duct partially bypassing the second compressor.

5. The forced induction device of claim 4, further comprising a third bypass duct that branches off from the intake pipe upstream of the first compressor and downstream of the second compressor and issuing into the intake pipe downstream of the first compressor, the third bypass duct diverting some of the fresh air compressed by the second compressor past the first compressor.

6. The forced induction device of claim 5, further comprising a fourth control valve in the third bypass duct for shutting off a bypassing of the first compressor.

7. The forced induction device of claim 6, further comprising a third control valve in the intake pipe downstream of the second compressor and upstream of the second entry, and a fifth control valve in the second bypass duct, the third and fifth control valves enabling flow through the first and second compressors to be implemented independently of one another.

8. A combustion engine comprising:
    at least one cylinder, the cylinder having an inlet port, a first outlet port and a second outlet port, a first outlet valve for selectively opening and closing the first outlet port and a second outlet valve for selectively opening and closing the second outlet port;
    an adjustable variable valve timing system for varying valve timings of the valves and for shutting down the second outlet valve; and
    a forced induction device that includes:
    first and second exhaust turbochargers, a first exhaust line directing all exhaust gas emerging from the first outlet port of the cylinder to the first exhaust turbocharger, and a second exhaust line directing all exhaust gas emerging from the second outlet port of the cylinder to the second exhaust turbocharger,
    a first connecting duct downstream of a first turbine of the first turbocharger and upstream of a second turbine of the second exhaust turbocharger for supplying the second turbine with exhaust gas from the first turbine,
    a first control valve in the first conducting duct and configured to selectively block the first connecting duct to prevent exhaust gas that has flowed through the first turbine from flowing to the second turbine,
    a first bypass duct connected to the first connecting duct at a first branch, the first bypass duct issuing at a first entry into a tailpipe line downstream of the second turbine to bypass the second turbine, and
    a second control valve in the first bypass duct for blocking or opening the first bypass duct.

9. The combustion engine of claim 8, wherein the second outlet port is closed by the second outlet valve at a speed and/or load range of the combustion engine below a threshold value.

10. The combustion engine of claim 9, wherein the second outlet port is opened with the aid of the second outlet valve at a speed and/or load range of the combustion engine above the threshold value.

* * * * *